June 26, 1934.   L. R. OSTLUND   1,964,645
RECEPTACLE FILLING DEVICE
Filed Dec. 21, 1931
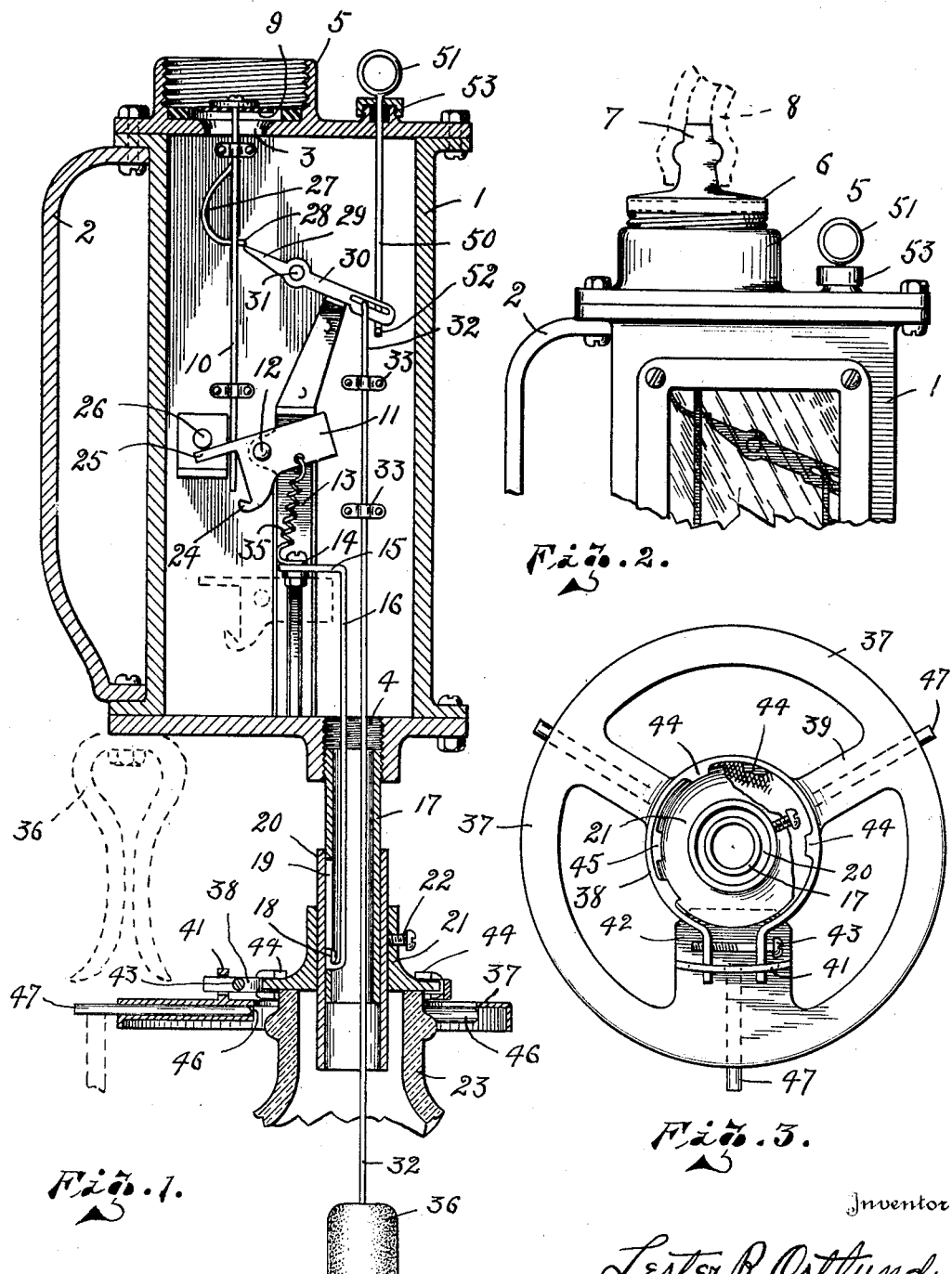
Inventor
Lester R. Ostlund.
By Geo. Stevens.
Attorney Patented June 26, 1934

1,964,645

UNITED STATES PATENT OFFICE 1,964,645

RECEPTACLE FILLING DEVICE

Lester R. Ostlund, Duluth, Minn.

Application December 21, 1931, Serial No. 583,606

1 Claim. (Cl. 226—127)

This invention relates to receptacle filling devices and has special reference to one particularly adapted for use in filling bottles or the like and wherein the application of same to the bottle or other receptacle will automatically open the supply of liquid, and when the receptacle or container is filled to a predetermined height will automatically operate to close the supply of liquid.

The principal object is to provide a more practical, simple, and efficient device of this character than heretofore known.

Other objects and advantages of the novel structure will appear in the following description of the invention.

Referring now to the accompanying drawing, forming part of this application, and wherein like reference characters indicate like parts:

Figure 1 is a vertical sectional view through one of the filling devices showing portions of the mechanism in elevation;

Figure 2 is a side elevation of the upper end of the filler illustrative of its connection with a hose or the like and Figure 3 is a plan view of one form of applicator for the device.

1 represents a rectangularly shaped housing, preferably of narrow, oblong construction and equipped upon one of its narrower edges with a handle as illustrated at 2 for convenience in manipulation of same. This housing is provided at its upper end near one edge with the intake opening 3 and at its lower end adjacent its opposite edge with the discharge opening 4.

The inlet opening is surrounded with an externally screw threaded thimble 5 for the reception of for example a funnel or externally screw threaded cap 6 having an annular bulged nipple 7 for application of a rubber hose indicated at 8, thus providing a supply of liquid for the filler. The intake opening 3 is controlled by the vertically reciprocable valve 9 carried upon the stem 10 and which stem is manipulated upwardly by the dog 11 pivoted as at 12 upon the back side of the housing. The pivotal connection for this dog is carried upon the vertically slidable carriage 13 also operable upon the back side of the housing and which carriage is attached as at 14 to the laterally extending arm 15 of the rod 16. This latter extends downwardly through the discharge opening 4 of the housing and within the depending pipe 17 screw threaded within said discharge opening, where the lower end of the rod 16 is attached as at 18 through the elongated slot 19 in the pipe 17 to the sleeve 20 which is vertically reciprocably fitted externally of the pipe 17.

Slidably attached externally of the sleeve 20 is the flange collar 21, attached thereto as by the set screw 22. This flanged collar is designed to impinge the extremity of the neck of a bottle, for example, as illustrated at 23, so that when the device is set down upon a bottle, or the bottle raised up to the device by one hand while the device is being held in the other, or supported in any other manner, the sleeve 20 will be raised or slid upwardly on the pipe 17, and thus lift the carriage 13, together with the dog 11, and carry upwardly the stem 10 by virtue of the lower end of the latter being caught in the hooked finger 24 of the dog, which, when in its lowermost position, occurs directly under the stem 10, as illustrated in dotted lines. Now as the stem 10 is raised to its uppermost position by such action, it will assume the position shown in Figure 1 of the drawing, simultaneously with the dog 11 being raised to its uppermost position, when the finger 25 of the dog will have engaged the laterally extending stop or pin 26, thus tipping the dog 11 free from engagement with the lower end of the stem 10 ready to permit of said stem dropping downwardly when the time arrives for such descent.

To retain the stem 10 and valve 9 in uppermost position, thus opening the intake 3 of the housing, I have provided the struck out tongue 27 in the stem, the latter being preferably of flat sheet metal, and so arched this tongue to extend through the opening resulting from its making, so that the extreme end 28 thereof extends through the opposite side thereof and becomes automatically engaged above the free finger like end 29 of the lever 30. The latter is pivoted as at 31 on the back wall of the housing and is operated at its opposite end by the float control rod 32, slidably operated in the keepers 33 against the back wall of the housing. This rod carries the float 36 upon its lower end which may or may not be adjustable longitudinally thereupon, as desired, so that when the liquid rises to a predetermined level in the receptacle being filled, the float will be lifted together with the rod 32 tripping the connection of the lever with the finger 27 and allowing the valve and stem to drop, and, as before stated, free of the dog 11.

As auxiliary means for selectively manually stopping the flow of liquid into the bottle, in the event occasion may arise for such, I have provided the rod 50, which is preferably rectangular in cross section to prevent its turning in a hole of similar size through the top of the housing, and above which it is formed as a loop 51 for convenience in grasping by the hand. A hook 52 is formed on the lower end beneath the slotted end of the lever 30 so that by raising this rod 50 the lever 30 may be raised by hand at any time desired to shut off the supply of liquid to the filler and bottle. From this construction it will be seen that the auxiliary attachment in no way adds to the burden of the float in its operation of the lever, and the rod 50 may be surrounded with a suitable stuffing box or gland, indicated at 53, if preferred.

Now when the bottle is filled and removed from its upward engagement with the collar 21, the rod 16 with the carriage 13 and dog 11 will drop, and the dog thus free itself from the pin 26 and will, either and/or both, by the action of the spring 35, assume its horizontal position as shown in dotted lines again beneath the end of the valve stem ready to lift same to a bottle or receptacle.

It is believed from the above the operation of the device is readily comprehended and that the same may be used in various ways in the process of filling different shaped receptacles, and may be equipped with a clip 36 to fit down over the edge of a large container, like a tub or the like, and left safely operating for an indefinite time, as it will automatically shut itself off when the receptacle is filled.

A further novel feature is provided in conjunction with the flanged collar 21, in the removable disc like extension 37 carrying the centrally disposed upwardly turned, adjustable collar 38, it being formed integral or at least attached to the spoke like arms 39 and 40, while the free ends thereof are slidably carried in the upwardly extending flange 41 upon the enlarged flat spoke like member 42, the adjustability being accomplished by means of the screw 43. Inwardly projecting lugs 44 are provided from both upper and lower edges of the flange 38, and the flange of the collar 21 is provided with one or more notches as at 45 in the circumferential edge thereof which may be notched to register with one of the upper lugs 44 when application of the disc 37 is being made to the flanged collar 21, and the disc subsequently turned so as to fall within the flange 38 resting upon the lower lugs 44, where it may be securely bound as by the setting up of the screw 43 to thus clamp same. In addition radially disposed tubes 46 may be provided on the under sides of the spokes 39, 40 and 42 in which pins 47 may be adjusted for reaching outwardly and rest upon the edge of a large container to which the filler may be held.

While I have referred to the mechanism within the housing as being mounted on the back thereof and the front of the housing covered with glass or other transparent material, it is obvious that this housing may be constructed in longitudinally separable halves, and if desired the mechanism mounted on a separate removable portion without departing from the spirit of the invention, and that the device may be found conveniently applicable to different forms of receptacles.

Having thus described my invention, what I claim and desire to secure by Letters Patent, is:

Control means for filling a container with liquid comprising a housing provided with a valve controlled inlet at the upper end and an outlet, a pivotally mounted lever one end of which is engageable with the inlet valve to raise same to open position, means to disengage said lever from said valve when the latter is fully open, a float control rod extending through said outlet and into the receptacle to be filled, a pivotally mounted arm one end of which normally holds said valve open, the upper end of said rod being pivotally attached to said arm providing means whereby when the receptacle is filled the control rod will trip said arm and close the inlet valve.

LESTER R. OSTLUND.